United States Patent
Vasseur et al.

(10) Patent No.: US 9,432,248 B2
(45) Date of Patent: Aug. 30, 2016

(54) DYNAMICALLY COMPUTING FATE SHARING IN COMPUTER NETWORKS USING LEARNING MACHINES

(71) Applicant: Cisco Technology, Inc., San Jose, CA (US)

(72) Inventors: Jean-Philippe Vasseur, Saint Martin d'Uriage (FR); Grégory Mermoud, Veyras (CH); Sukrit Dasgupta, Norwood, MA (US); Jonathan W. Hui, Belmont, CA (US)

(73) Assignee: Cisco Technology, Inc., San Jose, CA (US)

( * ) Notice: Subject to any disclaimer, the term of this patent is extended or adjusted under 35 U.S.C. 154(b) by 267 days.

(21) Appl. No.: 14/163,488

(22) Filed: Jan. 24, 2014

(65) Prior Publication Data

US 2015/0188751 A1    Jul. 2, 2015

Related U.S. Application Data (60) Provisional application No. 61/922,384, filed on Dec. 31, 2013.

(51) Int. Cl.
*H04L 12/24* (2006.01)
*H04L 12/26* (2006.01)

(52) U.S. Cl.
CPC ........... *H04L 41/0618* (2013.01); *H04L 41/06* (2013.01); *H04L 41/0604* (2013.01); *H04L 41/0613* (2013.01); *H04L 41/16* (2013.01); *H04L 43/50* (2013.01); *Y02B 60/33* (2013.01)

(58) Field of Classification Search
CPC ...................... G06F 11/0781; G06F 17/30185; H04L 41/0233; H04L 41/065; H04L 41/0681; H04L 43/06; H04L 43/08; H04L 41/06; H04L 41/0604; H04L 41/0613; H04L 41/0618; H04L 41/16; H04Q 3/0087
See application file for complete search history.

(56) References Cited

U.S. PATENT DOCUMENTS

| | | | |
|---|---|---|---|
| 6,385,609 B1 * | 5/2002 | Barshefsky | .......... H04Q 3/0087 |
| 7,889,666 B1 * | 2/2011 | Pei | ........................ H04L 41/065 370/242 |
| 2006/0056291 A1 | 3/2006 | Baker et al. | |
| 2008/0270593 A1 * | 10/2008 | Hirsch | ................ H04L 41/0233 709/224 |
| 2010/0123572 A1 * | 5/2010 | Thubert | .............. H04L 41/0681 340/527 |
| 2011/0194417 A1 | 8/2011 | Jonnala | |

(Continued)

OTHER PUBLICATIONS

Newman, et al., "Finding and Evaluating Community Structure in Networks", Phys. Rev. E 69, 026113, arXiv:cond-mat/0308217v1, Aug. 11, 2003, 16 pages.

(Continued)

*Primary Examiner* — Le H Luu
(74) *Attorney, Agent, or Firm* — Parker Ibrahim & Berg LLC; James M. Behmke; Stephen D. LeBarron (57) ABSTRACT

In one embodiment, a device (e.g., learning machine) determines a plurality of fate-sharing group (FSG) nodes in a computer network that are prone to simultaneously send an alarm upon detecting an event. As such, the device may elect one or more FSG owner nodes as a subset of the FSG nodes, and instructs the FSG group such that only FSG owner nodes send an alarm upon event detection.

25 Claims, 8 Drawing Sheets

(56) References Cited

U.S. PATENT DOCUMENTS

| | | |
|---|---|---|
| 2012/0069837 A1 | 3/2012 | Pearce |
| 2012/0246303 A1* | 9/2012 | Petersen .......... G06F 17/30185 709/224 |
| 2013/0042147 A1* | 2/2013 | Tonouchi ............ G06F 11/0781 714/37 |
| 2013/0182700 A1* | 7/2013 | Figura ..................... H04L 43/08 370/352 |
| 2013/0227055 A1 | 8/2013 | Vasseur et al. |
| 2014/0047108 A1* | 2/2014 | Tse .......................... H04L 43/06 709/224 |

OTHER PUBLICATIONS

Vasseur, et al., "Dynamically Computing Fate Sharing in Low Power and Lossy Networks Using Learning Machines", U.S. Appl. No. 61/922,384, filed Dec. 31, 2013, 31 pages, U.S. Patent and Trademark Office, Alexandria, VA.

Winter, et al., "RPL: IPv6 Routing Protocol for Low-Power and Lossy Networks", Request for Comments 6550, Mar. 2012, 157 pages, Internet Engineering Task Force Trust.

* cited by examiner

PHYSICAL AND TOPOLOGICAL VIEWS

SAME POWER LINE FEEDING THE METERS

TOPOLOGY FORMED BY THE SAME SET OF METERS

DYNAMICALLY COMPUTING FATE SHARING IN COMPUTER NETWORKS USING LEARNING MACHINES

RELATED APPLICATION

This application claims priority to U.S. Provisional Application No. 61/922,384, filed Dec. 31, 2013, entitled: DYNAMICALLY COMPUTING FATE-SHARING IN LOW POWER AND LOSSY NETWORKS USING LEARNING MACHINES, by Vasseur, et al., the contents of which are herein incorporated by reference.

TECHNICAL FIELD

The present disclosure relates generally to computer networks, and, more particularly, to the use of learning machines within computer networks.

BACKGROUND

Low power and Lossy Networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. The challenging nature of these networks is exacerbated by the large number of nodes (an order of magnitude larger than a "classic" IP network), thus making the routing, Quality of Service (QoS), security, network management, and traffic engineering extremely challenging, to mention a few.

Machine learning (ML) is concerned with the design and the development of algorithms that take as input empirical data (such as network statistics and performance indicators), and recognize complex patterns in these data. In general, these patterns are then used to make decisions automatically (i.e., close-loop control) or to help make decisions. ML is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, association rule learning.

One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Learning Machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, techniques are shown and described relating to dynamically computing fate sharing in low power and lossy networks using learning machines. In one embodiment, a device (e.g., learning machine) determines a plurality of fate-sharing group (FSG) nodes in a computer network that are prone to simultaneously send an alarm upon detecting an event. As such, the device may elect one or more FSG owner nodes as a subset of the FSG nodes, and instructs the FSG group such that only FSG owner nodes send an alarm upon event detection.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1:
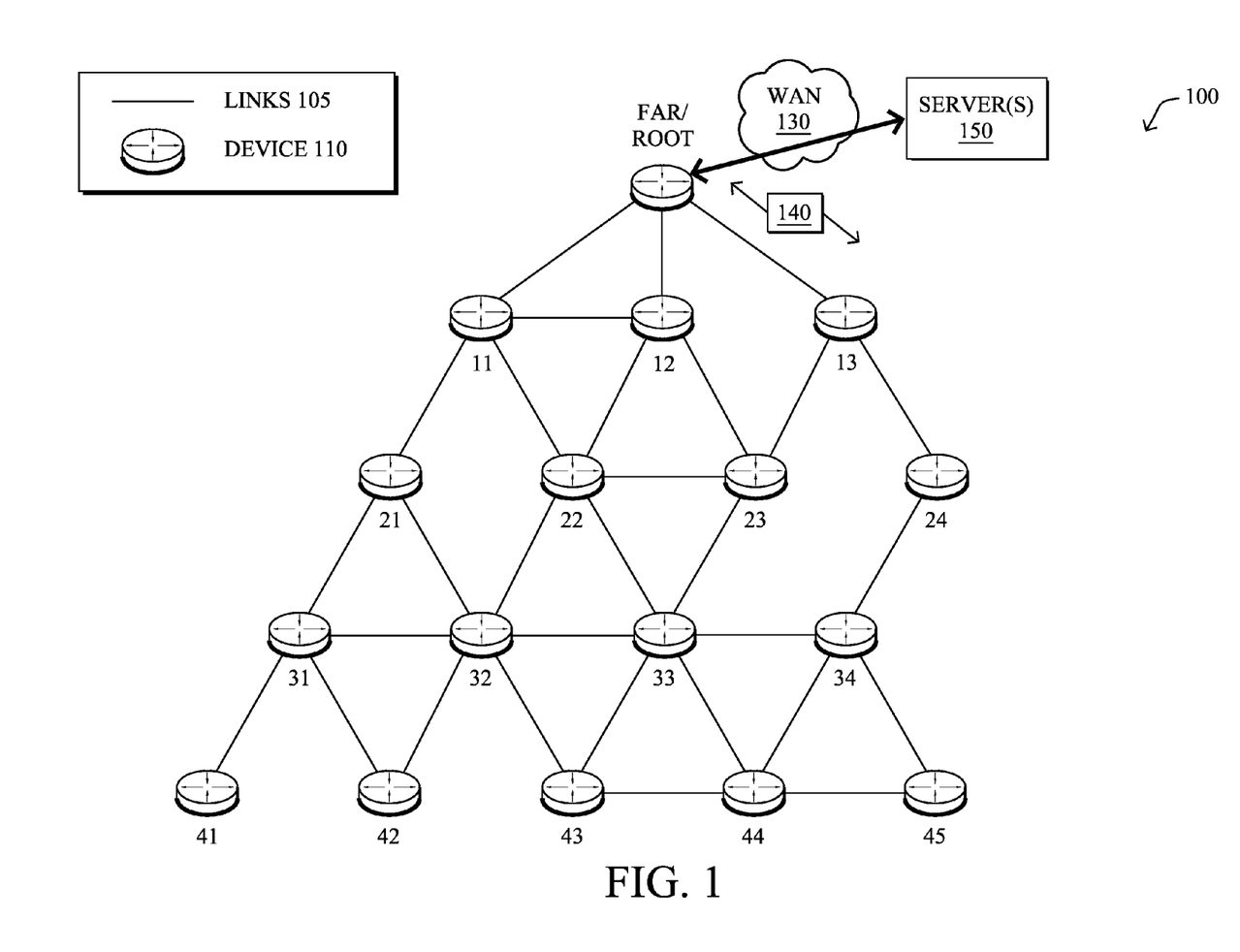
FIG. 1 illustrates an example communication network.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
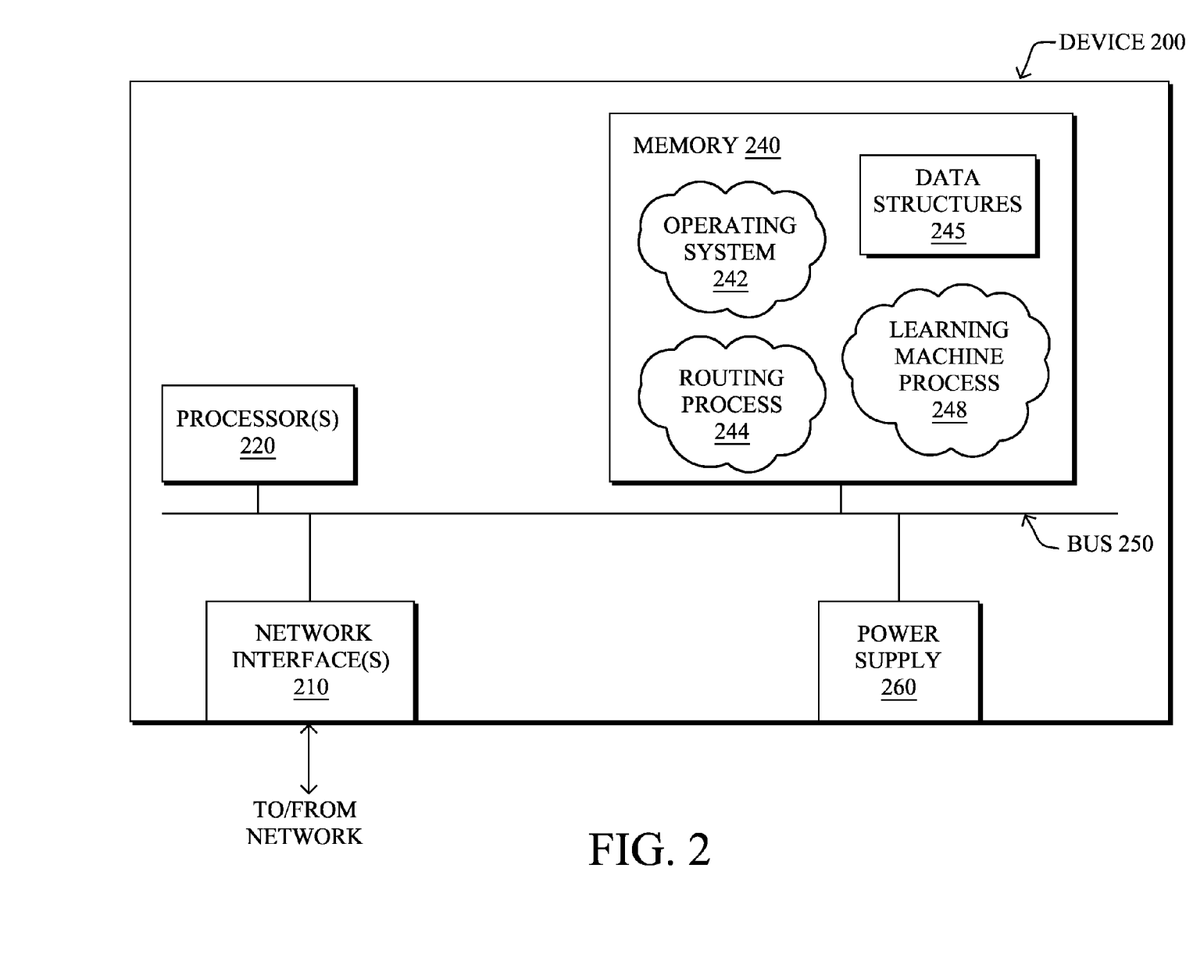
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "learning machine" process 248, which may be configured depending upon the particular node/device within the network 100 with functionality ranging from intelligent learning machine algorithms to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" (or "Internet of Everything" or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs), FARs, or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

Figure 3:
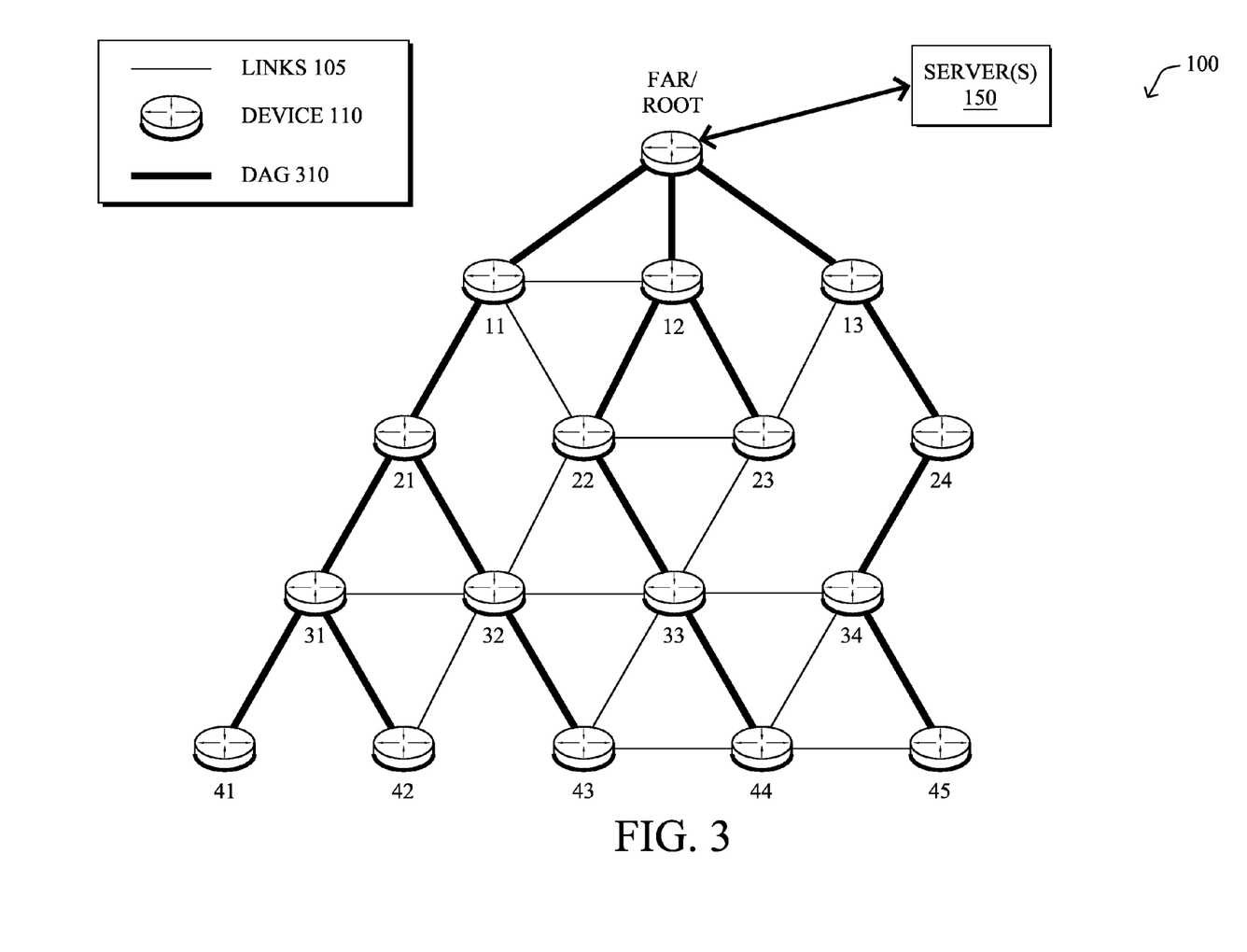
FIG. 3 illustrates an example directed acyclic graph (DAG) in the communication network of FIG. 1.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

Learning Machine Technique(s)

As noted above, machine learning (ML) is concerned with the design and the development of algorithms that take as input empirical data (such as network statistics and performance indicators), and recognize complex patterns in these data. One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator. Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

In particular, many LMs can be expressed in the form of a probabilistic graphical model also called Bayesian Network (BN). A BN is a graph G=(V,E) where V is the set of vertices and E is the set of edges. The vertices are random variables, e.g., X, Y, and Z whose joint distribution P(X,Y,Z) is given by a product of conditional probabilities:

$$P(X,Y,Z)=P(Z|X,Y)P(Y|X)P(X) \quad \text{(Eq. 1)}$$

In the context of LMs, BNs are used to construct the model M as well as its parameters.

Fate sharing is a known fact in communication networks. A notorious example is the multiplexing of lambdas over an optical network made of OXC; although, IP-links may appear totally disjoint for the routing protocol, the failure of a transponder or a fiber cut would inevitably lead to the failure of a number of links. This led to the specification of Shared Risk Link Groups (SRLG) in the IP/GMPLS world where administrative flags (e.g. SRLG) are used to tag links that share fate, which can be used when computing back-tunnel for example to ensure that the backup tunnel path and the protected link are effectively disjoint. When an SRLG fails, this triggers a number of alarms processed by the network management and other protocols. That being said, the number of messages is not problematic in these high-speed networks. In contrast, LLNs are of limited bandwidth (~75 kbits for 15.4 shared among thousands of devices, or even below 10 kbits/s with PLC P1901.2 for example). Consequently, sending alarms related to a unique event is a major issue in such networks and may lead to temporary congestion and packet loss, thus affecting even further the network, which led to sometimes turning off CoAP messages to mitigate this issues. Such alarms may be related to the networking control plane (e.g., link or node down, etc.) or the application itself. For the sake of illustration, consider the case of Power Outage Notification (PON), which is a critical function in Smart Grid AMI networks. Electric meters typically contain some small amount of energy storage (e.g., in the form of super capacitors) that allows a handful of transmissions (e.g., 3 PON messages within 30 seconds of losing mains power). These PON messages notify neighbors that the device is experiencing a power outage. The neighbors then forward the messages to an outage management system that allows an electric utility to track the power outage. While experiencing a power outage, a meter does not perform any other communication functions (e.g. receiving, forwarding, transmitting messages other than PON, etc.) as they would consume the limited energy budget.

In many cases, LLN devices must communicate using a channel-hopping link layer. This requirement is driven both by regulatory compliance and the fact that channel-hopping systems offer better spectral efficiency. As an example, each CG-Mesh interface determines its own unicast receive schedule. Neighboring devices must synchronize with its unicast schedule to properly communicate a unicast frame. By having each device determine their own schedule independently, neighboring transmitter-receiver pairs can communicate simultaneously on different channels. CG-Mesh also overlays a network-wide broadcast schedule, where all devices are synchronized to the same channel-hopping schedule. The broadcast schedule is only active for a fraction of the time (e.g., 25%), but allows efficient broadcasts since a single transmission can reach an arbitrary number of neighbors. This hybrid approach allows CG-Mesh to maximize spectral efficiency for unicast communication while also allowing efficient broadcast communication. In one example, a device splits a 30-second window into three 10-second windows. Within each window, the device randomly chooses a broadcast slot and time within the broadcast slot to transmit a PON. The device transmits PONs using a broadcast slot in attempt to reach any neighboring device that still has mains power.

Unfortunately, the current PON transmission strategy does not scale well in very dense networks for the following reasons:

1) Broadcast slots only form a fraction of the channel capacity. Current networks are configured to dedicate 25% of time to broadcast and 75% of time to unicast. In normal operation, unicast traffic dominates broadcast traffic and the networks are configured accordingly.

2) Using broadcast to send PONs will cause any neighboring device that still has mains power to buffer and report the PON. In dense networks, each neighbor maintains a PON and the network as a whole reports many duplicate messages. As a result, the memory and link utilization for the network as a whole is not very efficient.

The techniques herein, therefore, maximize the reliability of communicating alarms related to a single event in both sparse and dense networks, a critical challenge in LLNs, by using the concept of Fate Sharing Groups (FSG) and FSG owners dynamically determined thanks to learning machines.

Said differently, the techniques herein propose a radically different approach to handle alarm messages generated by nodes simultaneously when detecting the same event (one example scenario that would lead to a burst of alarms over a network using shared media). The techniques introduce the concept of a Fate Shared Group (FSG) where all elements of the FSG are subject to sending simultaneous alarms. Within an FSG an algorithm is used to determine a subset of owners responsible for sending alarms along paths taking into account the network topology. Such paths may be explicit (dynamically computed by the FSG computation engine) or as computed by the routing topology. A goal of the path is to decrease the number of alarms while increasing the probability of success to receive at least one alarm indicative of the FSG failure. The techniques herein introduce the notion of a co-occurrence graph, on which community detection algorithms can be applied for determining the various FSGs present in the network. A last component specifies scheduled shadow PONs per FSG in order to check the computation of FSG and ensure that at least on PON message is received for each FSG failure.

Illustratively, the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., optionally in conjunction with other processes. For example, certain aspects of the techniques herein may be treated as extensions to conventional protocols, such as the various communication protocols (e.g., routing process 244), and as such, may be processed by similar components understood in the art that execute those protocols, accordingly. Also, while certain aspects of the techniques herein may be described from the perspective of a single node/device, embodiments described herein may be performed as distributed intelligence, also referred to as edge/distributed computing, such as hosting intelligence within nodes 110 of a Field Area Network in addition to or as an alternative to hosting intelligence within servers 150.

Figure 4:
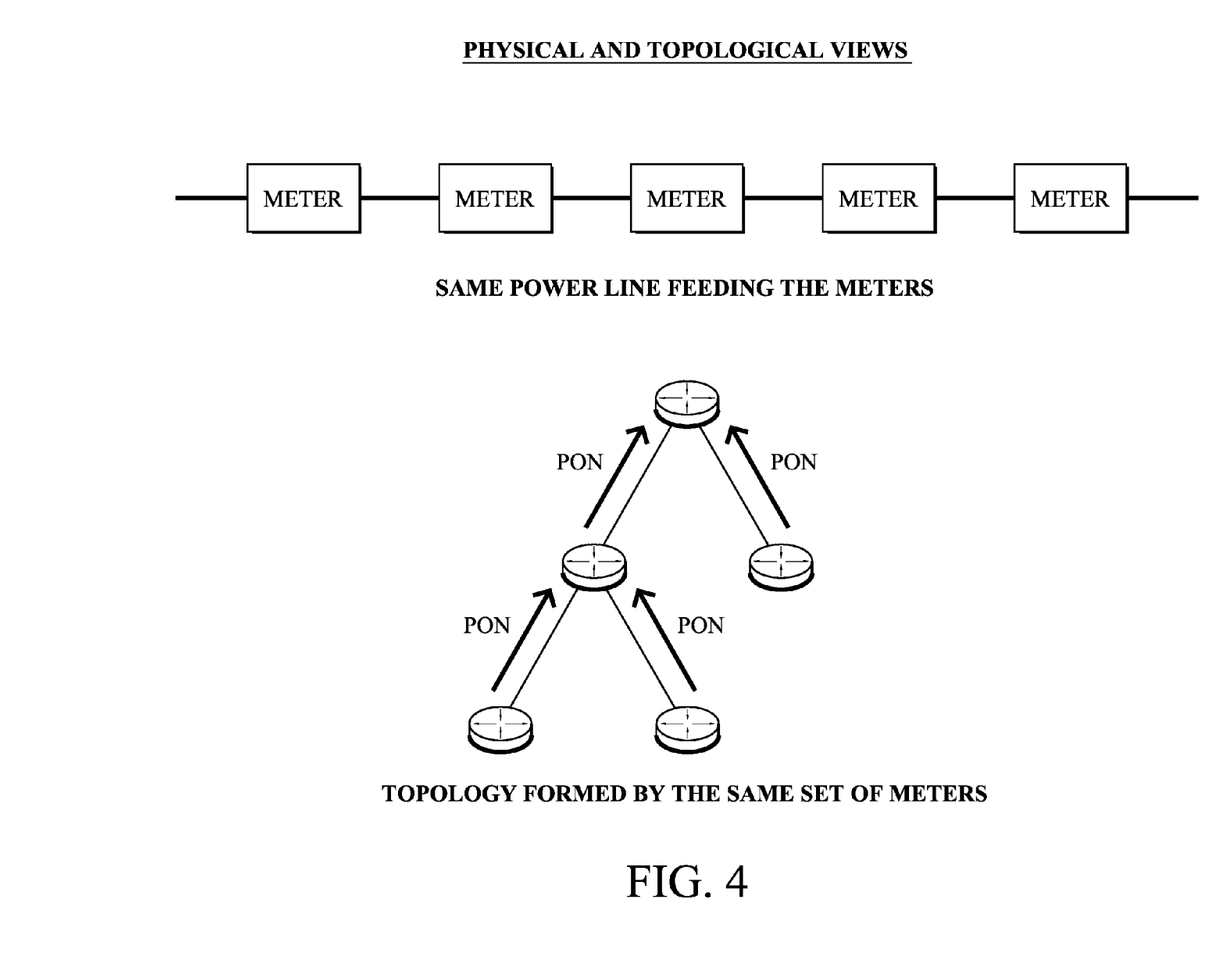
FIGS. 4-6 illustrate an example of dynamically computing fate sharing in low power and lossy networks using learning machines.
Figure 5:
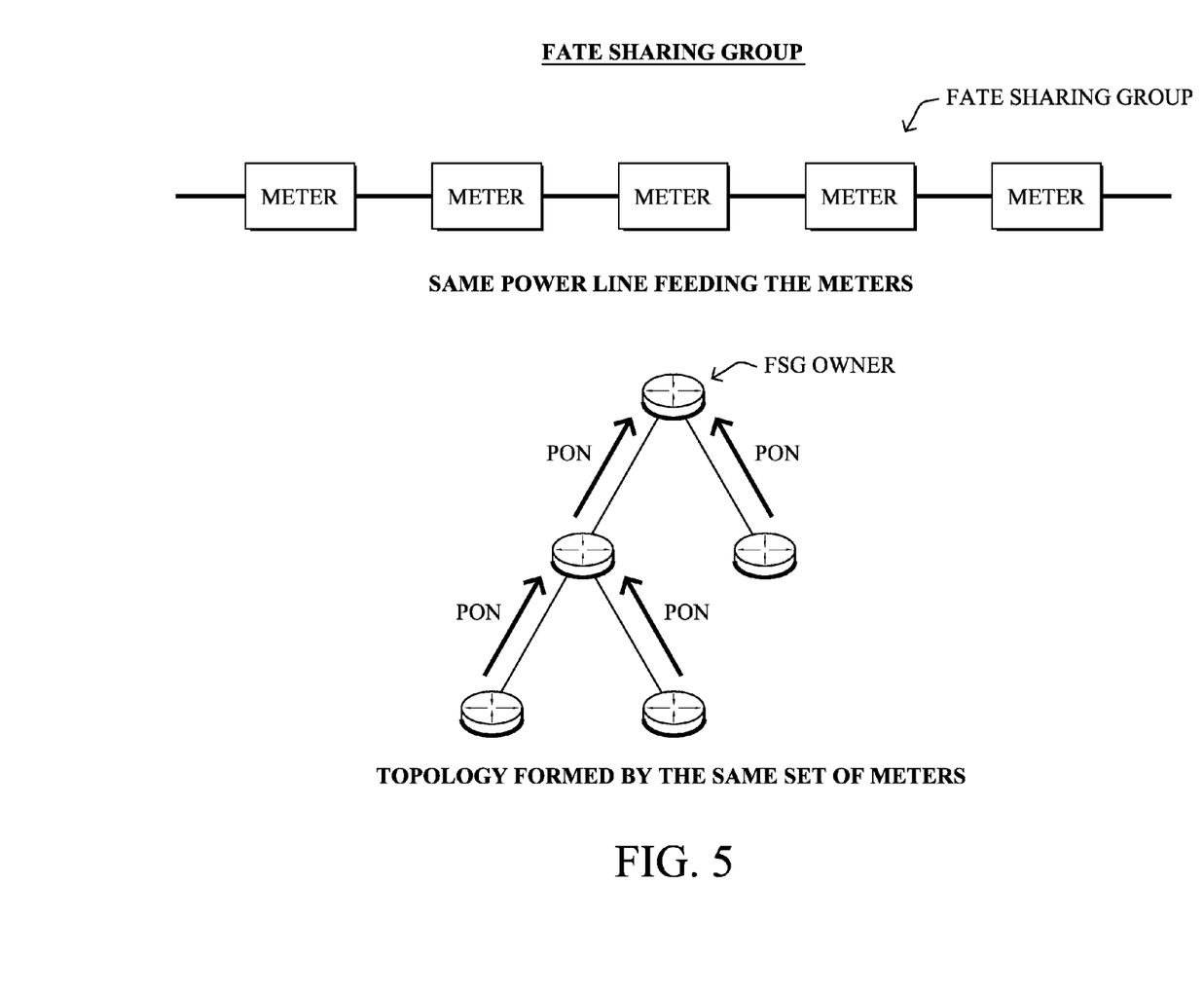
Figure 6:
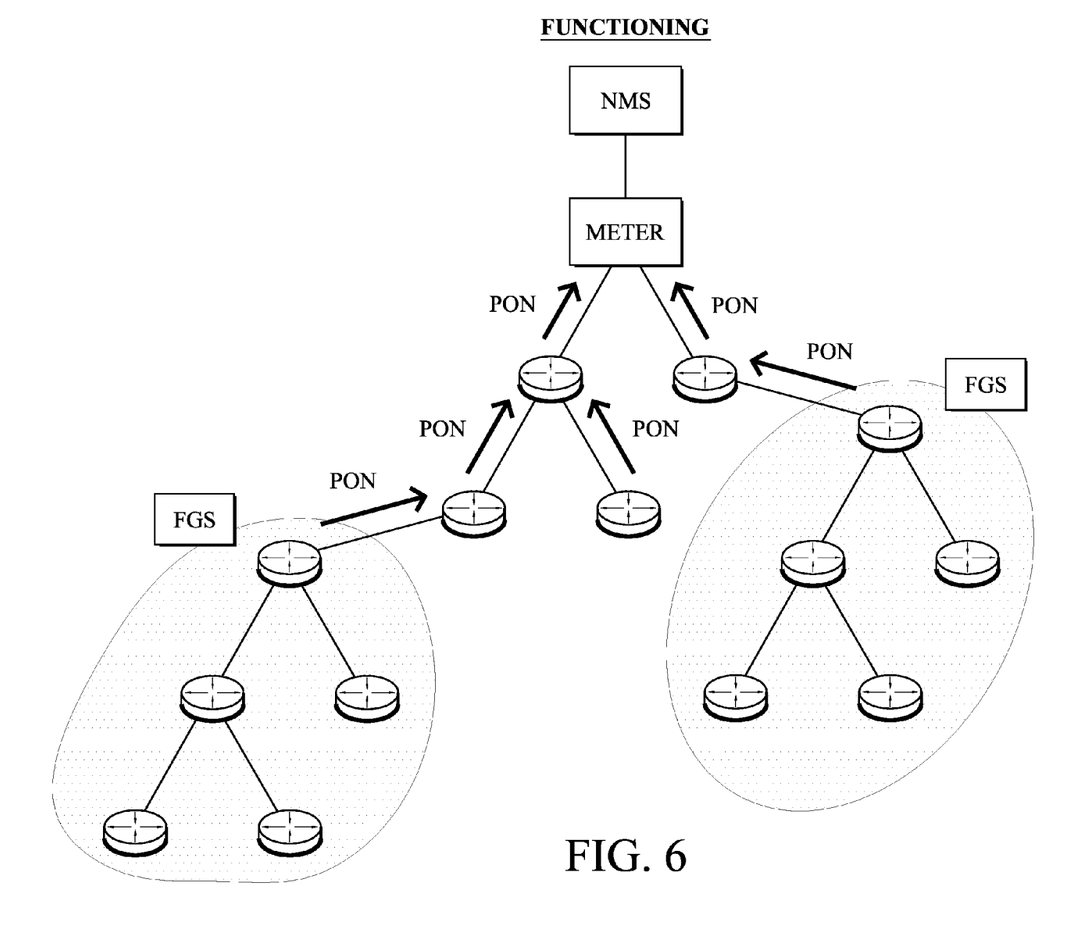

Operationally, as shown in (and with general reference to) FIGS. 4-6, the concept of Fate Sharing Group (FSG) in a computer network, particularly an LLN, is introduced. An FSG can be described as a set of nodes that are prone to simultaneously send an alarm (or other message) upon detecting an event (typically when detecting link/node failure, a DDoS, or an external event such as a power outage, but also an application driven event such as the detecting of a radioactivity radiation level). In contrast with existing approaches, the notion of FSG is a group of nodes that are likely to experience the same event (such as a power outage), thereby sending multiple alarms over the shared media reporting the same event. Different from other similar FSGs (e.g., SRLGs used to report that a single failure of a fiber) the techniques herein describe the mechanism by which FSGs are computed and by which FSG owners are determined and computed in order to solve the issue of aggregating the alarms and alleviating the network from resulting congestion.

A first component herein dynamically computes an FSG. The first component gathers relevant information required to build FSGs from all alarms generated. To that end, alarms messages may be timestamped using an optional IPv6 header.

In order to compute an FSG, the techniques herein specify the following approach: alarm messages are intercepted by a Learning Machine hosted on a router (note that networking alarms are usually not encrypted thus Software Defined Networking techniques such as DPI using OnePK can be used to intercept these alarms). Alarms are then stored along with their respective timestamps, and potentially forwarded to an NMS agent. Messages that occur within the same short time interval are clustered together. When clustering multiple alarms from nodes, say A, C, and D, one may then conclude that they all belong to the same FSG={A,C,D} (see details below on clustering technique). Of course, more nodes may belong to the FSG, but their alarms messages may have been lost. However, as time goes by and more alarms are received, FSG are incrementally updated. Indeed, if, later on, successive PON messages are received from A, C and G that are clustered together, the techniques herein may conclude that the FSG is actually {A,C,D,G}, but that the alarm message from D was lost this time (just like the alarm message was lost from G the first time). This systematic approach consisting in merging all clusters that have common members for building FSGs would work in scenarios with a single level of fate sharing (i.e., only the power cable may fail, but no higher-level element in the hierarchy of the grid).

Figure 7:
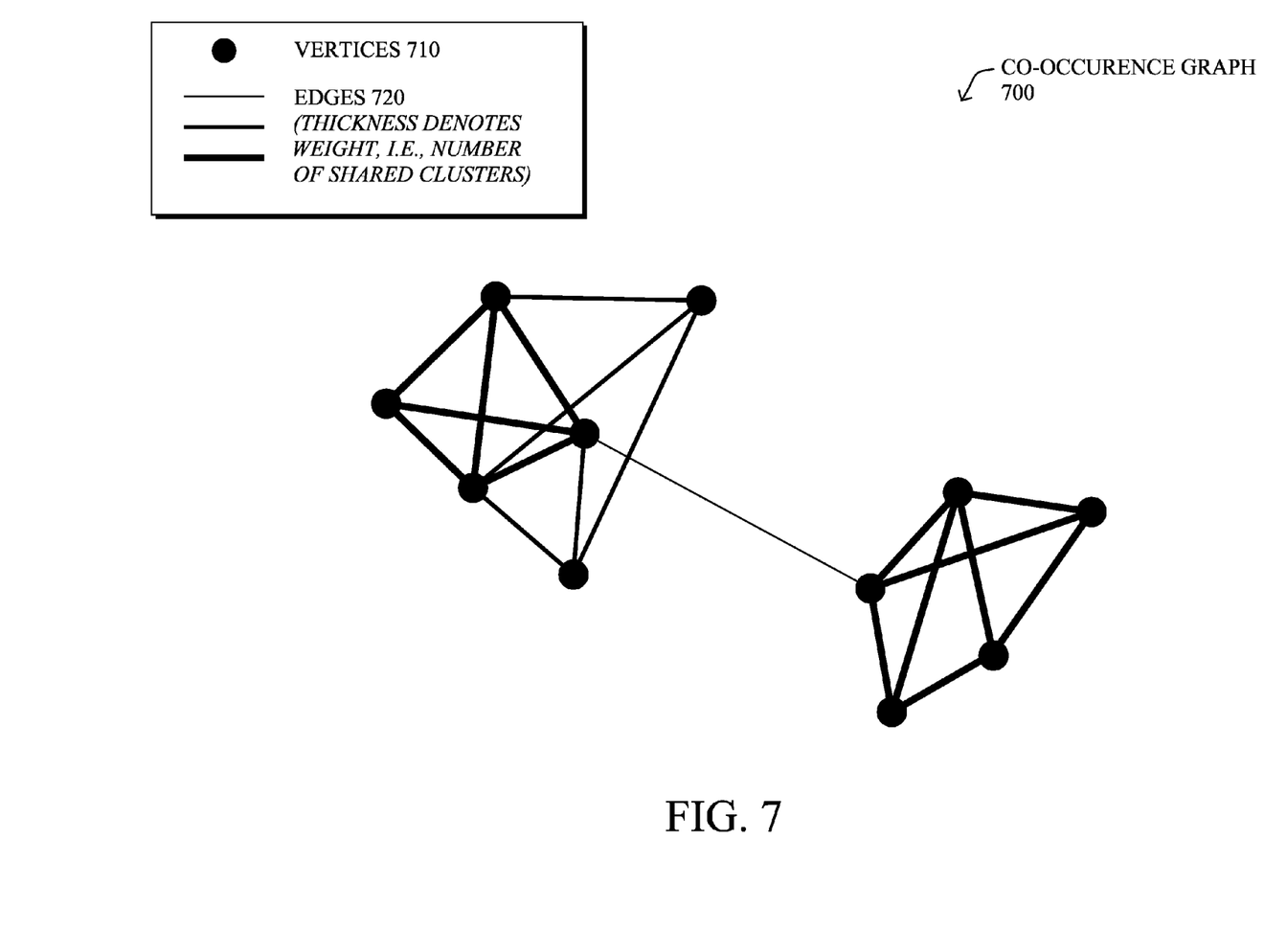
FIG. 7 illustrates an example co-occurrence graph.

To derive the FSG from these clusters in a more flexible manner, the techniques herein introduce the concept of co-occurrence graph 700 as shown in FIG. 7, that is, a graph G=(V,E) whose vertices 710 are the different nodes in the network, and the edges 720 denote the fact that two nodes have been clustered together. The weight (e.g., thickness as shown) of each edge is the number of clusters they have in common. Based on this graph G, one may then determine the various FSGs that are present in the network by using tools from network science, and in particular algorithms for community detection such as modularity-based methods, clique percolation methods or divisive methods. Each community discovered by the algorithm on the co-occurrence graph forms one FSG. For the sake of completeness, note that the simple greedy approach that consists of merging clusters that have common members is equivalent to a strategy where communities are simply connected components of the graph. When using more elaborate algorithms for community detection, the techniques herein rather try to identify groups of densely connected nodes, but the various communities are not necessarily completely disconnected from each other. This allows for accounting for the presence of multiple levels of resource sharing in the underlying system as well as the random co-occurrence of unrelated power outage in two distinct regions in the grid. Note that not all occurrences of a device/node sending a simultaneous alarm indicate an FSG (such as the thin edge between two nodes in the graph 700).

An approach for guiding the merging process is the concept of modularity, introduced by Newman in (Newman, M. E. J. & Girvan, M. (2004) Phys. Rev. E 69, 026113). The modularity is the number of edges falling within groups (i.e., edges whose source and destination belong to the same group), minus the expected number in an equivalent network (that is, with the same group structure), but with edges placed at random. When modularity is positive, it indicates the presence of community structures, and when it is negative, it indicates the lack of such structures. Therefore, any clustering algorithm shall increase the modularity, which we will note Q hereafter.

Some notably efficient algorithms exist for clustering very large graphs (up to tens of thousands nodes). In particular, (Newman, M. E. J. (2004) Phys. Rev. E 69, 066133) introduces a simple greedy algorithm in $O(n2)$ with n the number of nodes, which starts with as many communities as there are nodes in the network, and then simply merge communities such that the increase in modularity is maximized (or the decrease in modularity is minimized). Doing so, the algorithm constructs a sequence of (n−1) community structures, from which it picks the one that maximizes the modularity Q. Therefore, the techniques herein are directed to the creation and recognition of FSGs by clustering the underlying co-occurrence graph using community detection techniques described above.

Once an FSG has been computed, an objective of the second component consists in electing a set of FSG's owners. If the FSG is made of N elements (e.g., nodes, links), the techniques herein execute an algorithm in order to dynamically elect M. This second component is directed to the dynamic determination of M (M may be equal to 1, 2 or even 3) according to the network connectivity and routing topology. Observing the number of elements N, the algorithm consists in classifying the path from each element to the root according to the path reliability.

If at least one element with Path_ETX<Numberhops*Alpha with Alpha>1 (very close to 1), then M is set to 1 (there exists at least one node with a path offering a very high reliability—note that policy may require M>1 regardless of the path quality to ensure very high reliability. If no such path can be found or policy requires M>1, then two elements are selected that provide diverse paths, each path having at least a high enough reliability, using the current routing topology. Indeed, if such a path exists, by simply electing these M nodes, this would ensure that paths are diverse and PON can be routed following the existing topology. Note that the computation engine may take into account geographical proximity to favor truly diverse paths (two paths may be diverse from a routing topology standpoint while sharing links from wireless standpoint). If no such path can be found, explicit paths are computed that may not intersect with the computed routing topology. In other words, explicit routing is used to forward alarms without following the computed routing topology; note that hybrid approach may be used where a subset of the path from the M element may use explicit routing where other elements would use the routing topology. A newly defined message is then sent by the computing engine to notify each of the M FSG owners along with the path type to be used (default, computed by the routing protocol or explicit in which case the explicit path is provided to the owner).

Dynamic adjustment of M: in another embodiment M is dynamically adjusted according to the number of alarms received, which we note P. If P<M alarms are received by the Learning Machine, this may either be due to traffic loss (M-P alarms have been lost) or because the FSG has not been computed properly (too aggressive merging of clusters). In the former case, the techniques herein add an additional counter to the alarm timestamp used to track lost alarms, along with an exponential backoff algorithm used by remote node to retransmit non-acknowledged alarms. This allows the Learning Machine to eventually and systematically receive all alarms; thanks to this mechanism, if upon receiving an alarm from a FSG F comprising M members, only P.

In another embodiment, a historical profile from the topology can be used to help in the determination of FSG owners. The Learning Machine engine knows the historical profile of the child-parent relationships and can thus infer which PONs will traverse common parents. A node that is the parent of a sub-DAG can be selected to become the FSG owner if it is seen that a large number of FSG members belong to a sub-DAG rooted at that node. It is true that several such nodes might exist at different depths of the sub-DAG (for example, two sub-DAGs might have the same common parents, in this case, the techniques herein could choose either the common parent, or the parents of the sub-DAGs). The node that is selected to be the FSG owner can be based on the type of the network. For example, in a very dense network, the FSG owner can be picked to be the parent of a very large sub-DAG whereas in sparse networks it can be the contrary.

Note that the FSG ownership may take into account link metrics that are distinct from the one used by the routing protocol (use the link quality as opposed to low delay for example). The M elements may also be chosen taking into account the FSG proximity.

Upon receiving one of the alarms messages, the Learning Machine engine then inspects its database in order to determine the failed FSG, and may either simply forwards the alarms or send newly defined aggregated message back to the backend application or the NMS (if aggregation of alarms is of interest on the uplink connecting the remote router to the NMS). Note that if the FSG database is stored in the NMS, a newly defined message is specified (e.g., CoAP) in order to inform the NMS of the FSG ownership and the operation described above is performed by the NMS.

In another embodiment the embodiments herein specify "shadow alarm" (test alarm) messages. In this component, once the nodes have joined the network, the DAG-root pushes down information regarding a periodic shadow alarm generation according to the pre-defined schedule. In this mode, at the same point in time, the nodes will generate an alarm corresponding to a specific event (e.g., a node failure or an application power failure). These alarm messages can be made unique using a flag that can be carried to show that this is a shadow alarm being generated only for FSG computing purposes. The time at which shadow alarms are generated could be during lean traffic hours so as to have the least disruption, and such shadow alarms may be sent as low priority traffic (e.g., Mark DSCP). Also, this mechanism could take place after long periods of time, say once every 2-3 days. It should be noted that this component is used generally only to verify that the FSG has been properly computed (there is at least one alarm received for each FSG with high probability).

Figure 8:
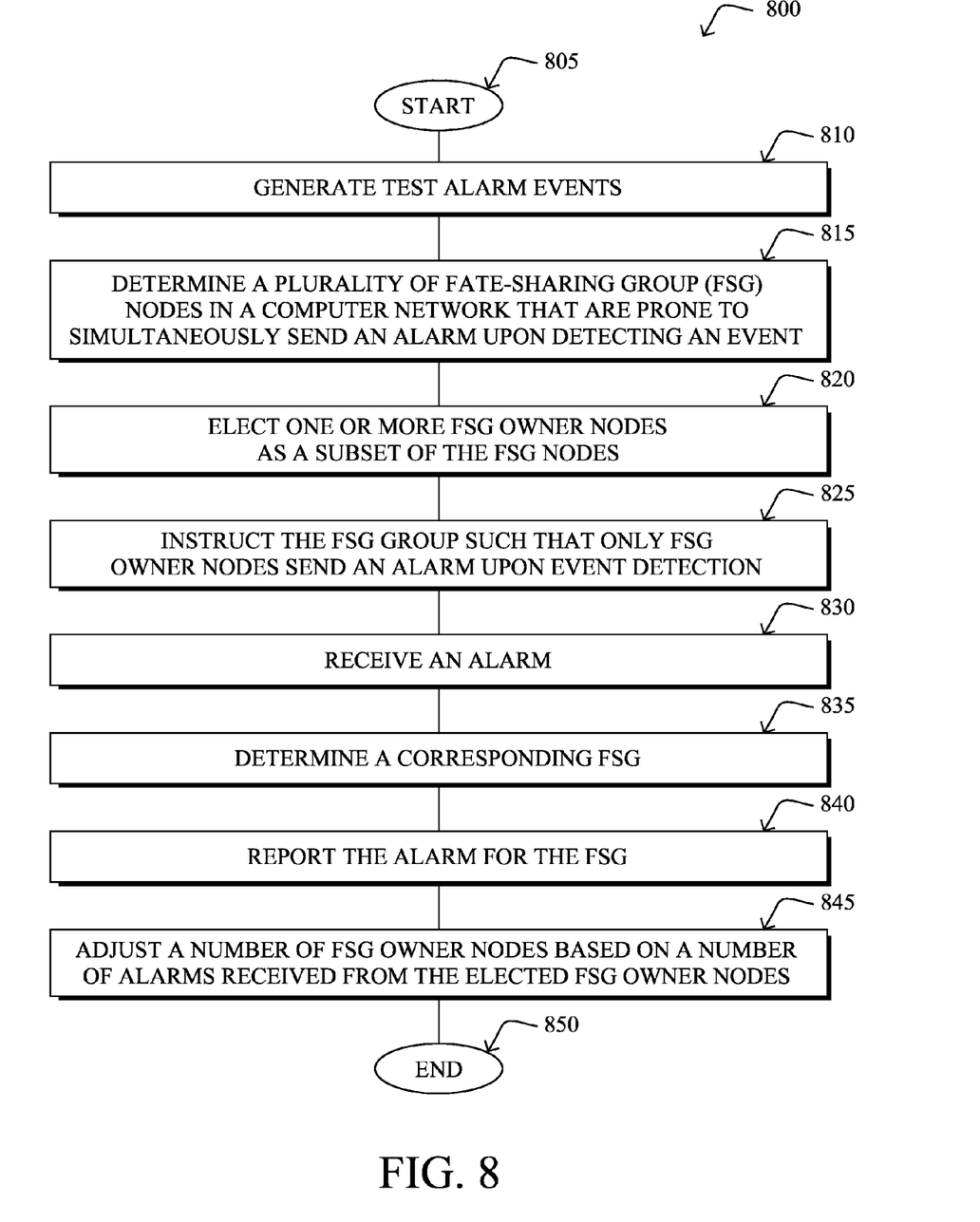
FIG. 8 illustrates an example simplified procedure for dynamically computing fate sharing in low power and lossy networks using learning machines.

FIG. 8 illustrates an example simplified procedure 800 for dynamically computing fate sharing in low power and lossy networks using learning machines in accordance with one or more embodiments described herein. The procedure 800 may start at step 805, and continues to step 810, where, as described in greater detail above, a device (e.g., a learning machine) may (if desired/needed) generate test alarm events (so as to not disrupt actual traffic), which, as mentioned above, can be to report a link failure, a node failure, a denial of service (DoS) attack, a power outage, an application-driven event, and so on. (Note that an unidentifiable event may also be associated with an alarm, so long as the device understands that it is an alarm or event detection of some sort). In step 815, the device determines a plurality of fate-sharing group (FSG) nodes in a computer network that are prone to simultaneously send an alarm upon detecting an event (e.g., a natural event or a test event). For example, as described above, the device may monitor alarms in the computer network to detect clusters of alarms in time from a set of nodes, and associates the set of nodes as members of a corresponding FSG. In one embodiment, this involves using a co-occurrence graph (where vertices of the graph are nodes of the network, and edges of the graph denote a clustered relationship between nodes), and detecting communities of nodes within the graph as the set of nodes of a corresponding FSG.

In step 820, the device elects one or more FSG owner nodes as a subset of the FSG nodes (e.g., based on a path reliability of sent alarms and/or based on overlap of sent alarms based on a network topology), and instructs the FSG group such that only FSG owner nodes send an alarm upon event detection in step 825. Note that the device may also instruct FSG owner nodes to use an explicit path for alarms.

In one embodiment, in response to receiving an alarm in step 830, the device may then determine a corresponding FSG in step 835, and reports the alarm for the FSG in step 840. Note that as mentioned above, the device may further adjust a number of FSG owner nodes based on a number of alarms received from the elected FSG owner nodes in step 845.

The illustrative and simplified procedure 800 ends in step 850. Note that though the procedure is shown with an end, the techniques described herein may continue to update the clusters based on new alarms (e.g., performed under an assumption that alarms are not received from all nodes that send an alarm for each event, as noted above), provide further instructions, receive additional alarms, etc.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for dynamically computing fate sharing in low power and lossy networks using learning machines. In particular, the technique herein address a critical issue with alarms and allows for a dramatic reduction of the number of alarms, thus increasing the probability to detect alarm and the overall efficiency of the whole system. For instance, referencing the above example with PON messages in a Smart Grid environment, upon receiving one of the PON messages, the Field Area Router (FAR) would then inspect its database in order to determine the failed FSG (and potentially sends message back to the backend application or the NMS). Thanks to the techniques herein, this would dramatically reduce the number of alarms, thus increasing the probability to effectively detect alarms, thus improving the overall efficiency of the whole system. Note that the issue of PON alarms is illustrative of a number of similar use cases that the techniques herein would address, and is not meant to be limiting to the scope of the embodiments herein.

While there have been shown and described illustrative embodiments that provide for dynamically computing fate sharing in low power and lossy networks using learning machines, it is to be understood that various other adaptations and modifications may be made within the spirit and scope of the embodiments herein. For example, the embodiments have been shown and described herein with relation to LLNs and related protocols. However, the embodiments in their broader sense are not as limited, and may, in fact, be used with other types of communication networks and/or protocols. In addition, while the embodiments have been shown and described with relation to learning machines in the specific context of communication networks, certain techniques and/or certain aspects of the techniques may apply to learning machines in general without the need for relation to communication networks, as will be understood by those skilled in the art. Also, while the term "alarm" has been used throughout, it is not meant to be limiting to a certain classification of notification, but merely implies event detection (i.e., not necessarily an emergency or the like).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining, by a network device executing a learning machine process, a plurality of fate-sharing group (FSG) nodes in a computer network that are prone to simultaneously send an alarm upon detecting an event, wherein the learning machine process intercepts and stores alarms overtime to identify which particular FSG a particular node in the computer network belongs;
   electing, by the network device, one or more FSG owner nodes as a subset of the FSG nodes; and
   instructing, by the network device, the FSG group such that only FSG owner nodes send an alarm upon event detection.

2. The method as in claim 1, further comprising:
   receiving an alarm;
   determining a corresponding FSG; and
   reporting the alarm for the FSG.

3. The method as in claim 1, wherein determining the plurality of FSG nodes comprises:
   monitoring the alarms in the computer network;
   detecting clusters of alarms in time from a set of nodes; and
   associating the set of nodes as members of a corresponding FSG.

4. The method as in claim 3, further comprising:
   updating the clusters based on new alarms.

5. The method as in claim 4, wherein the updating is performed under an assumption that the alarms are not received from all nodes that send an alarm for each event.

6. The method as in claim 3, wherein detecting and associating comprise:
   using a co-occurrence graph, wherein vertices of the graph are nodes of the network, and edges of the graph denote a clustered relationship between nodes; and
   detecting communities of nodes within the graph as the set of nodes of a corresponding FSG.

7. The method as in claim 1, further comprising:
   generating test alarm events.

8. The method as in claim 1, wherein an event is selected from a group consisting of: a link failure, a node failure, a denial of service (DoS) attack, a power outage, an application-driven event; and an unidentifiable event.

9. The method as in claim 1, wherein electing is based on a path reliability of sent alarms.

10. The method as in claim 1, wherein electing is based on overlap of sent alarms based on a network topology.

11. The method as in claim 1, further comprising:
    instructing FSG owner nodes to use an explicit path for alarms sent by the FSG owner nodes.

12. The method as in claim 1, further comprising:
    adjusting a number of FSG owner nodes based on a number of alarms received from the elected FSG owner nodes.

13. An apparatus, comprising:
    one or more network interfaces that communicate with a computer network;
    a processor coupled to the one or more network interfaces and configured to execute a process, wherein at least one of the processes is a learning machine process; and
    a memory configured to store the learning machine process executable by the processor, the learning machine process when executed operable to:
    determine a plurality of fate-sharing group (FSG) nodes in the computer network that are prone to simultaneously send an alarm upon detecting an event, wherein the learning machine process intercepts and stores alarms overtime to identify which particular FSG a particular node in the computer network belongs;
    elect one or more FSG owner nodes as a subset of the FSG nodes; and
    instruct the FSG group such that only FSG owner nodes send an alarm upon event detection.

14. The apparatus as in claim 13, wherein the process when executed is further operable to:
    receive an alarm;
    determine a corresponding FSG; and
    report the alarm for the FSG.

15. The apparatus as in claim 13, wherein the process when executed to determine the plurality of FSG nodes is further operable to:
    monitor the alarms in the computer network;
    detect clusters of alarms in time from a set of nodes; and
    associate the set of nodes as members of a corresponding FSG.

16. The apparatus as in claim 13, wherein the process when executed is further operable to:
    update the clusters based on new alarms.

17. The apparatus as in claim 16, wherein the updating is performed under an assumption that the alarms are not received from all nodes that send an alarm for each event.

18. The apparatus as in claim 13, wherein the process when executed to detect and associate is further operable to:
    use a co-occurrence graph, wherein vertices of the graph are nodes of the network, and edges of the graph denote a clustered relationship between nodes; and
    detect communities of nodes within the graph as the set of nodes of a corresponding FSG.

19. The apparatus as in claim 13, wherein the process when executed is further operable to:
    generate test alarm events.

20. The apparatus as in claim 13, wherein an event is selected from a group consisting of: a link failure, a node failure, a denial of service (DoS) attack, a power outage, an application-driven event; and an unidentifiable event.

21. The apparatus as in claim 13, wherein electing is based on one or both of a path reliability of sent alarms and overlap of sent alarms based on a network topology.

22. The apparatus as in claim 13, wherein the process when executed is further operable to:
    instruct FSG owner nodes to use an explicit path for alarms sent from the FSG owner nodes.

23. The apparatus as in claim 13, wherein the process when executed is further operable to:
    adjust a number of FSG owner nodes based on a number of alarms received from the elected FSG owner nodes.

24. A tangible, non-transitory, computer-readable media having software encoded thereon, the software a learning machine process, when executed by a processor, operable to:
    determine a plurality of fate-sharing group (FSG) nodes in a computer network that are prone to simultaneously send an alarm upon detecting an event, wherein the learning machine process intercepts and stores alarms overtime to identify which particular FSG a particular node in the computer network belongs;
    elect one or more FSG owner nodes as a subset of the FSG nodes; and
    instruct the FSG group such that only FSG owner nodes send an alarm upon event detection.

25. The computer-readable media as in claim 24, wherein the software when executed is further operable to:
    receive an alarm;
    determine a corresponding FSG; and
    report the alarm for the FSG.

* * * * *